US008554594B2

(12) United States Patent
Paull et al.

(10) Patent No.: US 8,554,594 B2
(45) Date of Patent: Oct. 8, 2013

(54) AUTOMATED PROCESS ASSEMBLER

(75) Inventors: Michael John Crichton Paull, Holt (GB); Alex William Durham Wilkinson, Woking (GB); Martin Andrew West, Winchester (GB); Said Tabet, Natick, MA (US)

(73) Assignee: Hat Trick Software Limited, London (GB)

( * ) Notice: Subject to any disclaimer, the term of this patent is extended or adjusted under 35 U.S.C. 154(b) by 236 days.

(21) Appl. No.: 12/860,582

(22) Filed: Aug. 20, 2010

(65) Prior Publication Data

US 2011/0179046 A1   Jul. 21, 2011

Related U.S. Application Data

(60) Provisional application No. 61/295,590, filed on Jan. 15, 2010.

(51) Int. Cl.
*G06F 7/00* (2006.01)
*G06F 17/30* (2006.01)
*G06Q 10/00* (2012.01)

(52) U.S. Cl.
USPC .......... 705/7.11; 705/348; 707/736; 707/754; 707/758; 709/204; 709/224

(58) Field of Classification Search
None
See application file for complete search history.

(56) References Cited

U.S. PATENT DOCUMENTS

| | | | |
|---|---|---|---|
| 2005/0144150 A1* | 6/2005 | Ramamurthy et al. | 706/45 |
| 2005/0223021 A1* | 10/2005 | Batra et al. | 707/102 |
| 2006/0184410 A1* | 8/2006 | Ramamurthy et al. | 705/8 |
| 2008/0004927 A1* | 1/2008 | Haller et al. | 705/7 |
| 2008/0154663 A1* | 6/2008 | Savur et al. | 705/7 |
| 2008/0189636 A1* | 8/2008 | Hood et al. | 715/771 |
| 2008/0270977 A1* | 10/2008 | Nucci et al. | 717/105 |
| 2009/0019428 A1* | 1/2009 | Li et al. | 717/128 |
| 2009/0112667 A1* | 4/2009 | Blackwell et al. | 705/7 |
| 2009/0281865 A1* | 11/2009 | Stoitsev | 705/9 |
| 2010/0275210 A1* | 10/2010 | Phillips et al. | 718/102 |
| 2011/0022672 A1* | 1/2011 | Chang et al. | 709/206 |

FOREIGN PATENT DOCUMENTS

WO   2009/056844 A1   5/2009

OTHER PUBLICATIONS

Object Management Group, "Business Process Model and Notation (BPMN) 2.0 Request for Proposal". Jun. 25, 2007.*
Cook, Jonathan E., Wolf, Alexander L. "Automating Process Discovery through Event-Data Analysis" Proceedings of the 17th Conference on Software Engineering 1995.

* cited by examiner

*Primary Examiner* — Alicia Lewis
(74) *Attorney, Agent, or Firm* — Workman Nydegger

(57) ABSTRACT

A method and system for automatically assembling a complete machine readable description of a process by observing and filtering digital messages executing on one or more message bus and that relate to the process. Message details are stored and a tracker record published in a common format. The stored message details are processed into a set of service execution path descriptions, which in turn are processed into the complete machine readable description of the process, using a suitable process design language. The invention automates the capture and documentation of a process, regardless of the complexities of the underlying messaging environment, and produces a complete and unambiguous description of the end-to-end process, free of errors, omissions and interpretation, thereby addressing a key need in any process re-engineering project, including the delivery of SOA implementations and other forms of agile and adaptable systems.

23 Claims, 8 Drawing Sheets

AUTOMATED PROCESS ASSEMBLER

FIELD OF THE INVENTION

The present invention relates to the automated capture and documentation of complex processes executing across large numbers of co-operating services linked via a heterogeneous mix of messaging environments.

BACKGROUND TO THE INVENTION

All businesses are underpinned by their processes. Process defines the competitive edge of one business over another. History is littered with examples where one company has emerged as the dominant entity as a result of its processing efficiency together with the ability to rapidly adapt its processes to market change Today, all reasonably sized companies have some form of process automation. Most usually this is delivered using bespoke technology that enables multiple applications to communicate across a messaging infrastructure. Typically, over the years, the messaging infrastructure fragments, resulting in the processes executing across a mix of messaging environments.

Concurrently process change is introduced and most usually the documentation recording these changes fails to keep pace with the changes being implemented. Progressively visibility of the end-to-end process is lost.

Initially the loss of process visibility is at the margin, but with the passage of time the "implementation drift" becomes sufficiently pronounced to require the system to be re-documented.

The need to re-document the system most usually arises when the company is considering some form of process re-engineering, but can arise in other circumstances—for instance migrating users to a new database, only to find the old database cannot be decommissioned due to a number of "rogue" or unknown users being discovered.

Re-documenting AS-IS processes is a necessary but manually intense, error prone, time consuming task that often results in little more than an interpretation of what the process engineers think the system is delivering. This requires the task to be repeated, often multiple times, until a definitive description of what the system is actually doing is derived. It is however, a task that cannot be ignored for without a precise understanding of the AS-IS processes, migration to the TO-BE processes is extremely difficult.

The Move Towards Service Orientated Architecture

The need to re-document existing processes has become more pronounced in recent years with the accelerated move towards greater system adaptability, via the introduction of the "Service Oriented Architecture" (SOA) approach. An example of this approach might be the ClearGate™ system described in WO2009/056844.

This new approach has been specifically adopted to enable software development teams to respond rapidly to changing business demands. The present invention described herein is designed to facilitate SOA adoption.

SOA is used as a means of enabling applications to co-operate, most usually via a centralised control mechanism (described as "Orchestration"), or as required, peer-to-peer (described as a "Choreography" or a "Collaboration" dependent on circumstances). This requires the existing (and unified) processes to be decoupled from the underlying co-operating applications and for these applications to be modularised and re-presented as a set of "services"—where a "service" is a specific item of functionality, able to be accessed via a standard set of protocols. In order to implement SOA it is firstly necessary to understand the AS-IS processes.

However, precisely capturing and documenting the AS-IS processes is an error prone and time consuming task, often made more difficult in merger and acquisition situations where legacy implementations and processes are inherited, without the benefit of any knowledge transfer detailing the complexities of the inherited architecture.

Conventional Approach to Capturing the AS-IS Process

The conventional approach to capturing an AS-IS process is to firstly inspect the system documentation. This provides some insight into how the system was originally designed but provides little certainty of operation of the current environment. Invariably, over time, various degrees of adaptation and change have been introduced that have not been fully documented. Containing this implementation drift may be part-addressed by inspecting the system message logs. This assists in augmenting the overall understanding of the system, but does not provide a guarantee that all possible execution paths available to a transaction instance will be identified.

To obtain a more complete understanding of the system it thus becomes necessary to interview and re-interview staff members to understand specific sections of the overall process. This is then followed by the deployment and re-deployment of test messages and the inspection and re-inspection of often widely distributed log files to identify if a particular part of the overall system is functioning as anticipated. Once an understanding of that particular part of the system is reached this is documented using MS-Word (or equivalent) and manually generated diagrams.

This procedure repeats until an overall understanding of the production environment is reached. This usually starts well, but as the process of re-documenting the system becomes more complex, progressively more time is spent checking and re-checking system interdependencies, redrawing diagrams and rewriting the documentation. The result is one of diminishing returns, as progressively more time is spent managing the documentation process and less time is spent on system analysis.

Eventually some sort of understanding of the end-to-end process is reached and the diagrams and the MS-Word documents (now typically amounting to hundreds of pages) are given to the developers for encoding. As these diagrams and documents are only an interpretation of the system, errors, anomalies and ambiguities are common. The resulting encoding reflects this, requiring numerous errors to be unwound. As each error is unwound, this has a knock-on effect on encoding elsewhere, resulting in an enormous re-coding effort.

Currently, it is not unusual to find in excess of 3 to 6 months is expended on the capture of the AS-IS processes. This is typically followed by another 3 to 6 months expended on the TO-BE system design and deployment. The cost runs into hundreds of thousands of US dollars. It is against this background that the technology detailed in the present invention has been developed.

SUMMARY OF THE INVENTION

According to a first aspect of the present invention, there is provided a method of assembling a machine readable description of a process from the exchange of digital messages between two or more services communicating across a heterogeneous messaging environment, the method comprising employing a computer, having a processor, Data Store, computer-readable media and memory, to execute instructions stored in the memory in order to cause the processor to perform the steps of:

(a) observing a plurality of digital messages in a plurality of messaging environments;
(b) filtering each digital message by comparing the service name of the digital message against a predetermined list of service names to be monitored;
(c) publishing a tracker record for each message in a common format independent of the associated messaging environment, the tracker record comprising the message, a message direction indicating whether the message has been sent from or retrieved by a service, and a service name for the service that has sent or retrieved the message,
(d) storing details of each digital message in a store by performing the steps of:
  (i) extracting a message type of the digital message using a predetermined query;
  (ii) extracting a unique identity of the digital message using a predetermined query, the unique identity comprising unique identifying information from one or more fields of the message; and,
  (iii) storing the digital message ordered by unique identity, timestamp for when the digital message was received or sent, service name, and message type,
(e) processing the store of digital messages into a set of service execution path descriptions by performing the steps of:
  (iv) assembling by unique identity a time sequence of message type, message direction, and service name; and,
  (v) creating a service execution path description for each unique sequence of timestamp, message type, message direction and service name, and
(f) processing the set of service execution path descriptions into the machine readable description for the process.

According to a second aspect of the present invention, there is provided a computer program product comprising one or more computer-readable media having thereon computer-executable instructions that, when executed by one or more processors of a computer, causes the one or more processors of the computer to perform the method for assembling a machine readable description of a process from the exchange of digital messages between two or more services communicating across a heterogeneous messaging environment according to the first aspect of the invention.

According to a third aspect of the present invention, there is provided a system adapted to assemble a machine readable description of a process from the exchange of digital messages between two or more services communicating across a heterogeneous messaging environment, the system comprising:
  at least one message bus along which the digital messages are carried;
  a data store for storing the messages and associated information; and,
  a processor adapted to:
    (a) observe a plurality of digital messages in a plurality of messaging environments on the at least one message bus;
    (b) filter each digital message by comparing the service name of the digital message against a predetermined list of service names to be monitored;
    (c) publish a tracker record for each message in a common format independent of the associated messaging environment, the tracker record comprising the message, a message direction indicating whether the message has been sent from or retrieved by a service, and a service name for the service that has sent or retrieved the message;
    (d) store details of each digital message in the data store by performing the steps of:
      (i) extracting a message type of the digital message using a predetermined query;
      (ii) extracting a unique identity of the digital message using a predetermined query, the unique identity comprising unique identifying information from one or more fields of the message; and,
      (iii) storing the digital message ordered by unique identity, timestamp for when the digital message was received or sent, service name, and message type,
    (e) process the store of digital messages into a set of service execution path descriptions by performing the steps of:
      (iv) assembling by unique identity a time sequence of message type, message direction, and service name; and,
      (v) creating a service execution path description for each unique sequence of timestamp, message type, message direction and service name, and
    (f) process the set of service execution path descriptions into the machine readable description for the process.

Where, in defining the present invention, the following explanations apply to some of the terms used:
  a "computer" is a programmable electronic machine that performs operations by receiving, storing and manipulating data and information, and providing output from these operations in a useful format
  a "computer program" or "application" is a sequence of instructions requiring a computer to perform a specific task
  a "computer program product", "applications", "software applications" and "utilities" are collections of computer programs and related data that collectively provide the instructions to a computer
  a "processor" is that part of a computer that carries out the instructions of a computer program or computer program product, applications, software applications and utilities
  "memory" refers to the physical devices used by a computer to hold computer programs and associated data on a temporary basis for execution by a processor
  a "computer process" comprises one or more computer programs the function of which is to perform some task required by the organisation.
  "computer-readable media" means any non-transitory storage medium (or memory) able to be accessed and read by a computer but does not include any transitory propagating signals Thus, the present invention solves the problems associated with existing methodologies by capturing the digital messages associated with a process and generating a process description using a suitable process design language. In particular, the present invention automates the capture and documentation of the AS-IS process, regardless of the complexities of the underlying messaging environment, and produces a complete and unambiguous description of the end-to-end process, free of errors, omissions and interpretation.

The resulting description is both "complete", meaning all service interactions associated with the process are captured from the initiating event to the final interaction regardless of the messaging infrastructure or mix of messaging infrastructures across which the service interactions may execute; and "unambiguous" meaning the description is a recording of the actual interactions observed on the messaging infrastructure. The resulting description of the existing, or AS-IS process, is described as the "Process Design". Other design artefacts may be generated from the Process Design for the purpose of documenting the AS-IS process.

The benefits of automating the capture and documentation of complex processes executing across multiple messaging environments fall into three categories:

Speed of Capture—the automated process capture approach can be demonstrated to reduce the number of man-days required to re-document an existing process by up to 90% compared to using conventional techniques.

Accuracy of Capture—as the automated process capture is performed by a software utility, the captured process description (Process Design) is free from both the errors and omissions commonly introduced when using manual techniques and any risk of system interpretation often encountered when manual procedures are employed.

Reduction in Code Correction—typically 15-20% of time expended on process re-engineering is deployed to correcting and refining the TO-BE process code. Most usually, the majority of this time is spent correcting errors resulting from an incorrect or ambiguous AS-IS process description. As the automated process capture approach eliminates AS-IS process description errors and ambiguities, this enables the TO-BE process code correction cycle to be eliminated and code rewriting to be focused on TO-BE process code improvement In the present invention, one or more localised agents, described as "Collectors", are deployed onto an existing network. In the case of a system such as described in WO2009/056844, a Collector is deployed across the existing gateway or gateways. The Collector(s) identify the interactions between the co-operating systems (being the internal network of the organisation and the external transport layer) and reports these to a centralised process recorder.

As a process may be comprised of multiple sets of digital messages each representing a different specific execution path available to a transaction instance, this centralised process recorder identifies each of these unique execution paths separately and aggregates these into the Process Design.

Similarly, in the present invention a Collector is deployed to each internal messaging environment being used and as described above, these Collectors observe and filter the digital messages being exchanged between the co-operating services. The digital messages thus identified are then stored in a centralised process recorder called the "Assembler Utility". This in turn processes the store of digital messages into a set of specific execution paths (or "Scenarios") that are then aggregated into the Process Design. As the Assembler Utility is agnostic as to the source of the service interactions, it is able to construct the Scenarios and the Process Design even though the AS-IS process being captured is executing across a heterogeneous mix of messaging environments.

Preferably, variations in the unique identifying information extracted from the one or more fields of a series of digital messages are correlated to maintain a chain of identities for each service execution path. For example, consider the following sequence of messages:

Message 1 has field A with value 111, such that the primary ID value is 111.

Message 2 has field A with value 111 and field B with value 222, such that the primary ID value is 111/222.

Message 3 has field B with value 222, such that the primary ID value is 222.

In this example, the chain of identities is A:111-> A:111; B:222-> B:222, and variations in primary IDs in the chain have been correlated to maintain the identity chain. For example, one message may relate to a quote for a particular trade, whilst a later message may relate to the actual executed trade. In this way, messages relating to a particular transaction can be tracked along a service execution path.

Consider the example of a Scenario captured by the present invention, where the client has generated multiple trades with identical transaction identifiers. The automated capture of the replicated execution paths enables erroneous functioning of the system to be identified, isolated and corrected within minutes as against hours using conventional techniques. This is a particularly relevant example, as in this circumstance each transaction event may be executing correctly across the interlinked services, and the problem lie in the generation of multiple, identical transaction identifiers. Identifying and correcting this error by manually inspecting the messaging log files would be a difficult and laborious task.

In order to identify all possible execution paths available to a transaction instance, a large number of randomized test messages are submitted into the system and a regression analysis performed. The service interactions generated by these test messages are captured and compiled into separate Scenarios as each unique execution path is identified. The Scenarios are then aggregated into an end-to-end representation of the process using a suitable process design language. This representation is described as the Process Design.

Other design artifacts may be generated from the Process Design to further support the documentation of the process. These artifacts may be diagrammatic, for example UML sequence diagrams or textual, for example HTML.

The Process Design so generated is not a representation of what the process engineers have interpreted as being the system functionality, but is a recording of how the system is actually functioning. As such it is free from the errors and ambiguities of the conventional AS-IS process capture approach thus enabling transition to the TO-BE process to be effected in a more efficient manner.

The technology may be deployed across any message bus that facilitates the exchange of digital messages between two or more co-operating services. Examples include gateways used for inter-departmental process execution (described as "Collaborations"): gateways used for inter-enterprise process execution (described as "Choreographies"): services co-operating via an enterprise service bus (ESB), via a Java Messaging Service (JMS), an MQSeries connectivity layer or via other forms of connectivity. The Data Store used while analyzing the output from the Collectors is usually an in-memory store, but it may be a file on a disk when memory capacity of the processor, in which the Assembly Utility is executing, is insufficient.

In an SOA implementation, the ESB is generally used as the connectivity layer to mediate messages (and data) between the service requesters and the service providers. Service requesters and providers can include Web Services as well as legacy applications, presented as services using standard SOA techniques.

The digital messages being observed and filtered by the present invention may take many forms although XML messages or derivatives thereof are preferred. Other forms include one or more of an object message, a text message, and a binary message.

In the context of the present invention, the endpoints of a message are the entry and exit points of the digital message onto the message bus. As such, this could be a JMS queue, an ESB endpoint, or a gateway input/output according to the implementation. As will be appreciated by those skilled in the art, any suitable entry and exit points on a message bus can be used to constitute the message endpoints.

Preferably, the service descriptions, the specific execution paths taken by a set of digital messages and the Process Design are created using an executable process design language, examples of which include Web Services Choreography Description Language (WS-CDL) and Business Process Modeling Notation Version 2 (BPMN2) although any suitable design modelling language may be used.

In the present invention, the observation and filtering of the digital messages is implemented in a message bus specific environment. In a preferred implementation, this would comprise the ClearGate™ system described in WO2009/056844. However, it could be a J2EE ESB environment, a message broker, or other messaging middleware environment.

It is preferred that digital messages observed and filtered in the present invention are published on a separate message bus. Preferably, these are published as a JMS Topic.

In the present invention, the steps of storing and processing the digital messages into service descriptions are implemented as a messaging environment independent utility. Similarly, it is preferred that the steps of assembling the specific execution paths taken by a set of digital messages into a Scenario and the aggregation of the Scenarios into the Process Design is implemented as a messaging environment independent utility. Creation of the Process Design is may be performed using WS-CDL tooling, but any tool set that supports a design modelling language, such as BPMN2, may be used.

The representation of the TO-BE process as a Process Design also enables the TO-BE process to be statically checked for unintended computational consequences prior to the deployment of code. Further, changes to the TO-BE process may be rapidly introduced without the need for extensive re-testing across inter-related services. Preferably, this is achieved by the use of BPMN2 or WS-CDL.

As will be appreciated by those skilled in the art, the present invention provides an innovative method and system for automatically assembling a complete description of a process by observing the digital messages relating to the process executing on one or more message bus, thereby addressing a key need in any process re-engineering project including the delivery of SOA implementations and other forms of agile and adaptable systems.

BRIEF DESCRIPTION OF THE DRAWINGS

An example of the present invention will now be described in detail with reference to the accompanying figures, in which.

DETAILED DESCRIPTION

Figure 1:
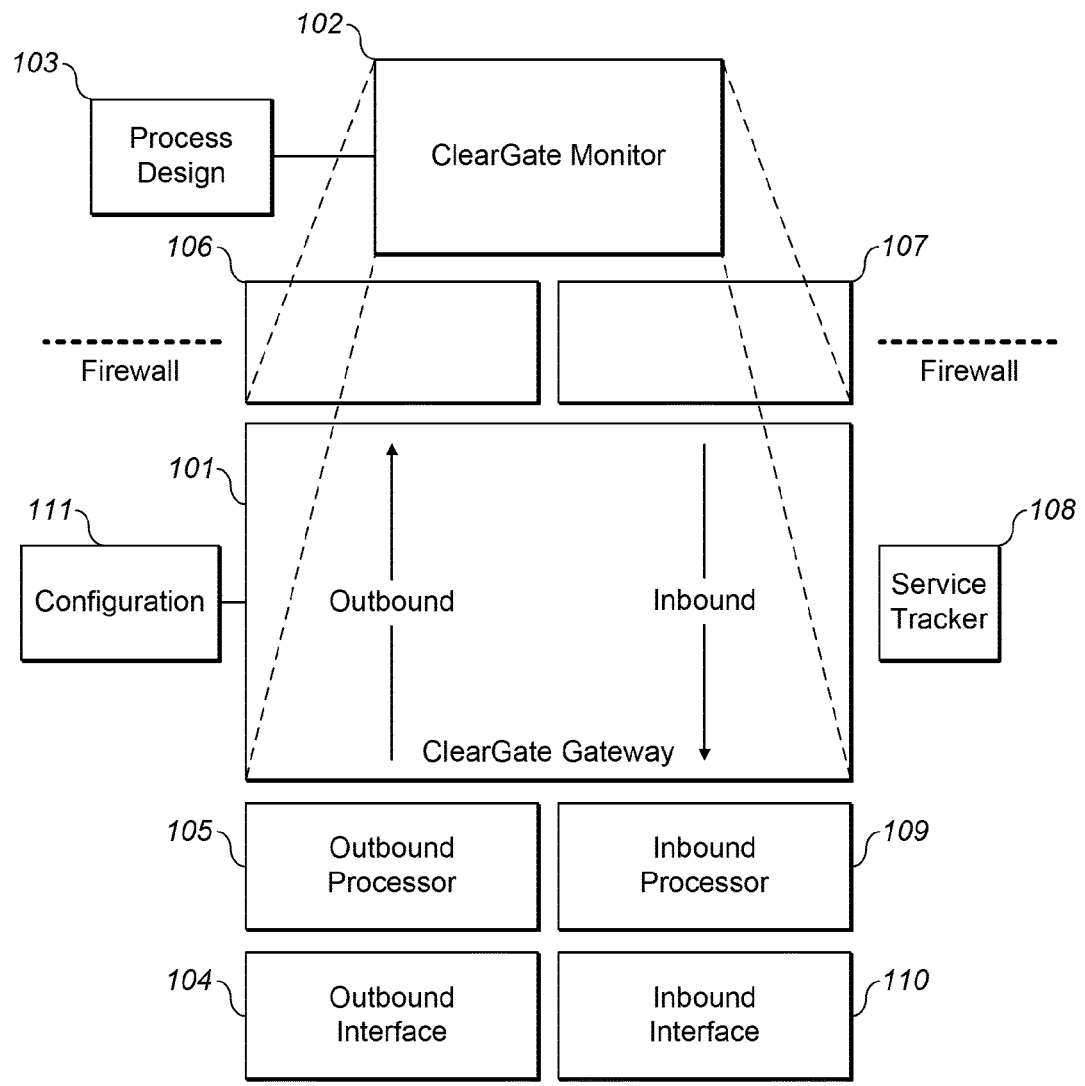
FIG. 1 shows schematically an instance of a ClearGate™ Intelligent Gateway for digital matching.

Before discussing the operation of the present invention in detail, we first review some alternative approaches that have been considered for addressing problems similar to those solved by the present invention. In the paper "Automating Process Discovery through Event-Data Analysis", Proceedings of the 17$^{th}$ Conference on Software Engineering (1995), the authors (Cook and Wolf) considered three possible approaches for inferring a process description from a set of test data. We briefly review these three approaches, and the following definitions for certain terms should be born in mind: an Event is a single action resulting in a change of state; an Event stream is a sequence of events; and a State machine is a flow chart detailing current state, transitions that cause state change, and the resulting state.

The RNET Method

This first approach considered by Cook and Wolf is the Recurrent Neural Network (or RNet) method, a technique based on a low-level view of a biological neural system.

The core assumption of this approach is that current state is determined by preceding activity. This is conventionally illustrated using a layered topography with the modules in the preceding layer forward feeding events to the following layer. To the basic RNet architecture is added a "recurrent" connection, which feeds state information from a subsequent layer to the preceding layer. This enables current state information to be provided as an input to the network thus enabling a state machine to be derived.

In the RNet approach, each module is configured with a value called the "activation threshold". This value must be surpassed before the module is able to "forward feed" an event to the next layer. Whether or not the activation threshold value is exceeded is determined by the input(s) the module receives. This is determined by assigning each input a value or "weight". The sum of these "weights" determines whether or not the activation threshold is surpassed.

In order to determine the value of the weights and activation thresholds, the network needs to be "trained". This requires a set of test (or "training") data to be deployed.

This data is typically sourced from historical records where a known output results from a known input.

Initially random connection weights and activation threshold values are set. A propagation algorithm is then used to incrementally seek the minimum value for the weights and activation thresholds. Once these values have been determined, the network is said to have been "trained" and may be used to model event streams where the output for a given input is unknown.

The k-Tail Method

The underlying premise of the k-Tail method is that current state is determined by future activity and any conditions that may need to be met. For example, a condition may be set that the process needs to pass all modules. Current state is determined by identifying all the possible future paths capable of fulfilling this condition.

The k-Tail method is a purely algorithmic approach that calculates the number of possible "futures" available to the process. Identifying the different "futures" is determined by identifying the length of the event stream "tails". Where two or more possible "futures" (or tails) are of the same length, these are merged and represented as a single execution path in the state machine.

The k-Tail method, whilst capable of inferring an accurate process model for a given set of data, is entirely governed by a parameter in the algorithm entitled "k". This parameter is used to define the "k-token" which in turn determines the length of the tail(s). Determining the value of "k" involves a trade-off between model simplicity and complexity. The smaller the value of "k", the higher the number of merged "futures" and the cleaner the inferred model: the higher the value of "k" the more generalised the resulting model.

The Markov Approach

The Markov approach is based on Markov Chains, a technique that predicts the likelihood of future events.

This may be illustrated by a frog jumping across a pond via a number of lily pads. The frog's next jump is influenced by where he is now (current state) whilst his next landing (future state) is determined by the probability of where he will next jump. If the frog only has two lily pads from which to choose, his next landing is as likely to be on one lily pad as the other.

A more complex example may be set in a trading room. In this example, a trader deals with only one client and uses only three types of behaviour: execute a trade (T), amend a trade (A) or confirm a trade (C). Once a trade is executed it must be either amended or confirmed, either of which is as equally likely to occur. If a trade is amended there is an even chance it will be amended again and if a trade is confirmed there is an even chance it will be confirmed a second time.

This behaviour can be expressed in terms of probabilities (P) as follows:

If the last action was "amend" (A) there is an even chance the next action will be "amend" (A), if not the next action will be either "trade" (T) or "confirm" (C)

If the last action was "confirm" (C) there is an even chance the next action will be "confirm" (C), if not the next action will be either "trade" (T) or "amend" (A)

If the last action is "trade" (T) the next action will either be "amend" (A) or "confirm" (C)

This may be displayed as a matrix:

|       |   | A    | T    | C    |
|-------|---|------|------|------|
| $P_1 =$ | A | 0.5  | 0.25 | 0.25 |
|       | T | 0.5  | 0.0  | 0.5  |
|       | C | 0.25 | 0.25 | 0.5  |

Assuming the probability of an event occurrence doesn't change it becomes possible to predict the probability of future events n-steps forward. For example:

|       |   | A     | T     | C     |
|-------|---|-------|-------|-------|
| $P_2 =$ | A | 0.438 | 0.188 | 0.375 |
|       | T | 0.375 | 0.25  | 0.375 |
|       | C | 0.375 | 0.188 | 0.438 |

|       |   | A     | T     | C     |
|-------|---|-------|-------|-------|
| $P_3 =$ | A | 0.406 | 0.203 | 0.391 |
|       | T | 0.406 | 0.188 | 0.406 |
|       | C | 0.391 | 0.203 | 0.406 |

Cook and Wolf extend this concept to develop what they call "the Markov method". This method uses an algorithm to convert the probabilities calculated across n-steps into states and state transitions.

The method uses event-sequence probability tables to enable the most probably to the least probably event sequences to be identified. Once the most-to-least probable event sequences have been identified, a state machine is derived. Once derived, the state machine may be "tuned" to accept only those event sequences that exceed a probability threshold.

Tuning the state machine involves a trade-off between model simplicity and complexity. If the probability acceptance threshold is set to 0, an accurate process model will be inferred for a given set of data. If the threshold is set anything above 0, low-probability event streams are excluded and the completeness of the model begins to degrade.

Summary of Alternative Approaches

The three approaches described above are all designed to provide only a process overview, suitable for further extension by a process engineer. In contrast, the present invention is designed to derive a definitive process description suitable for use by a system architect.

Although the Cook and Wolf inferred models are useful in verifying an existing implementation, all the approaches tend towards over-generalised process representations and suffer from scalability issues as process complexity increases.

Of the three approaches, the RNet method is the most difficult to use as it requires a large amount of test data to generate meaningful results. Obtaining a suitable quantity of test data is difficult as typically historical data contains errors and imperfections. Additionally, the recurrent connection in the RNet approach generates highly complex dynamics that induces network instability. For practical purposes, the RNet approach is not a viable alternative to the present invention.

The k-Tail method suffers from an inherent assumption that all processing events are sequential. This introduces a practical consideration as most software applications perform multiple tasks simultaneously. This could be addressed by viewing concurrent activity as randomly interleaved events in the event stream. This addresses one problem but raises another, as the event streams then become "noisy", meaning the streams would contain a degree of event randomness. As the k-Tail method has no ability to tolerate any form of abnormal process behaviour (or "noise"), the k-Tail approach is a non-viable alternative to the present invention.

The Markov method displays a similar problem to the k-Tail approach in that it imposes an artificial ordering on events. One possible solution is to "tune" the generated results to filter out the concurrent activity, but this results in a degradation of model completeness. The Markov approach is thus also not a viable alternative to the present invention.

The HELIXsystem Process Assembler

In order to describe the operation of the Process Assembler according to the present invention, we will do so in the context of the ClearGate™ system detailed in WO2009/056844. The ClearGate™ system is described as using a WS-CDL encoded model of a protocol against which conformance of gateway interactions are determined against a Process Design. However, this may as effectively be achieved using BPMN2 or any other suitable process description language.

In conceiving the present invention it became apparent that the effort in documenting the AS-IS process to enable the migration to the TO-BE process could be substantially reduced if the documentation of the AS-IS protocol could be automated. The present invention provides a method whereby this automation may be delivered.

As the present invention can be advantageously implemented using the ClearGate™ system, we begin by briefly describing the ClearGate™ system. FIG. 1 shows the components present in an example of a ClearGate™ Intelligent Gateway, as described in WO2009/056844. The ClearGate™ Intelligent Gateway comprises two main components: a ClearGate™ Gateway 101 and a ClearGate™ Monitor 102. However, as will be described below, the ClearGate™ Monitor 102 is replaced with a localised agent functioning as a "Collector" in the present invention. In this configuration the gateway interactions may be captured as Scenarios and aggregated to produce a Process Design.

Messages from internal services are received at the Outbound Interface 104, optionally processed by the Outbound Processor computer program 105 and the forwarded to the external service by the ClearGate™ Gateway 101. Messages from external services are received at the ClearGate™ Gateway 101, optionally processed by the Inbound Processor computer program 109 and the forwarded to internal service by the Inbound Interface 110. The ClearGate™ Monitor 102 monitors messages passing through the ClearGate™ Gateway 101 for conformance to the protocol defined by Process Design 103. Service Tracker component 108 is used by ClearGate™ Monitor 102 to inform interested parties of messaging actions passing across the gateway that vary from the Process Design 103.

When the present invention is applied in the ClearGate™ system, the monitor functionality described in WO2009/056844 is replaced with a localised agent functioning as a Collector. This Collector uses Service Tracker 108 to publish all the messages received and sent by the gateway to an Assembler Utility. The published Service Tracker records contain information about the nature of the messages being handled by the gateway. This includes the message type, the originator, the message direction and the original message.

The following example shows a response message to a request message sent by the DTCC, a clearing and matching venue used in the wholesale financial services industry. The messageType is NewIncreasePendingType. The operation attribute is not used in this environment. The value tag contains the content of the original message but is not shown here for clarity. The timestamp is date and time of the message.

```
<record xmlns="http://www.servicedescription.org/service/tracker"
    name="DTCC">
    <events>
        <sentMessage timestamp="1259705693268" >
            <message
            messageType="{OTC_RM_6-1}NewIncreasePendingType"
                operation=""
                    serviceType="DTCC"
                    type="response">
            <value>
```

The Service Tracker may combine several events in one tracker message for performance reasons and these are grouped within an <events> tag. The possible events in the collect mode are sentMessage and receivedMessage. The combinations of event type and message type are shown in Table 1 below. The Service Tracker publishes these messages on a JMS Topic which is configurable in the ClearGate™ configuration file. The default topic name is "tracker".

TABLE 1

| event/type | request | response |
| --- | --- | --- |
| sentMessage | Originator sent a request. | Service sent a response |
| receivedMessage | Service received a request | Originator received a response |

The method for the derivation of messageType is defined in a configuration file (in this instance is the ClearGate™ configuration file 111). For example, for simple message structures, of the form:

```
<submitTrade xmlns="http://www.helixsys.net/PMIExample">
    <tradeId>091124095220000</tradeId>
    <counterparty>MyBank</counterparty>
    <amount>331</amount>
</submitTrade>
```

The message type is a simple extraction of the root tag of the message. For more complex messages (such as DTCC FpML messages) a message type resolver can be specified in the configuration file 111. The message is passed to the resolver that returns the messageType. Another method, applicable to XML messages, is the use of xpath queries. The header of an FpML message might be as follows:

```
<OTC_RM xmlns="OTC_RM_6-1">
    <Manifest>
        <TradeMsg>
            <!--- This is an A-Attribute -->
            <Activity>New</Activity>
            <!--- This is an B-Attribute -->
            <Status>Submit</Status>
            <!--- This is an C-Attribute -->
            <TransType>Increase</TransType>
            <ProductType>CreditDefaultSwapShort</ProductType>
            <!--- This is an D-Attribute for identity -->
```

The message type resolver extracts the <Activity>, <Status> and <TransType> values to form the messageType, (in this case NewIncreaseSubmitType).

Assembler Utility

Figure 4:
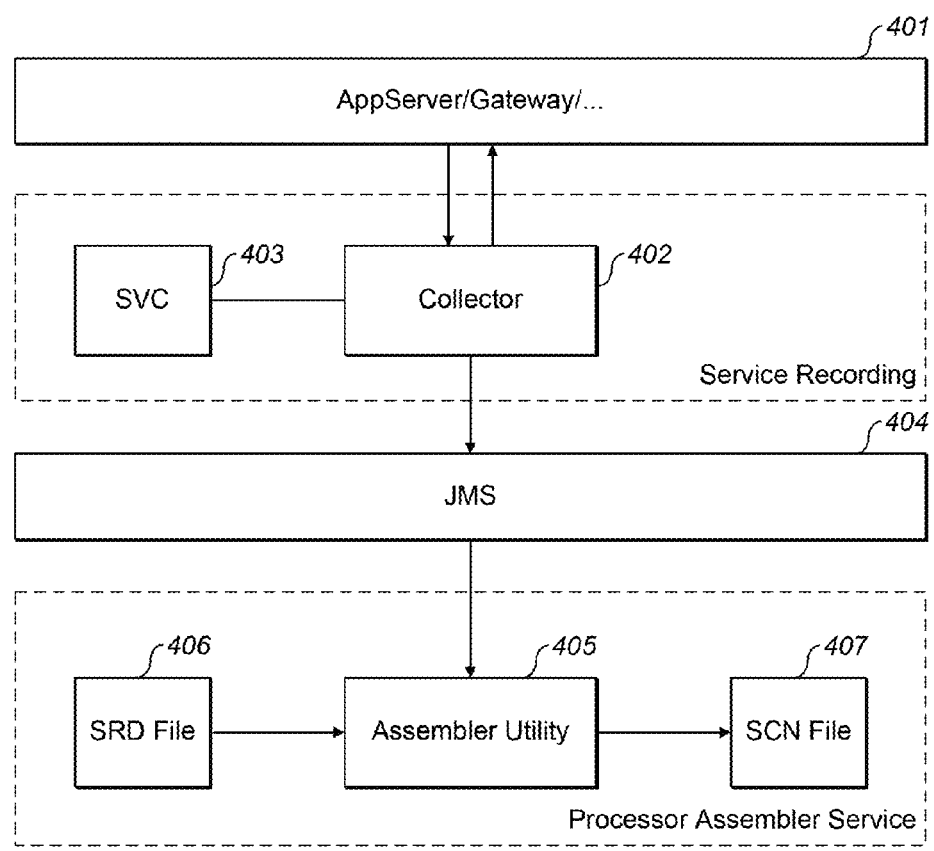
FIG. 4 illustrates the interaction of the components for the collection of service interaction information and process assembly according to the present invention.

The Assembler Utility, shown as 405 in FIG. 4, listens to the service tracker publishing topic and receives the reported Service Tracker messages identified by one or more Collectors.

Figure 6:
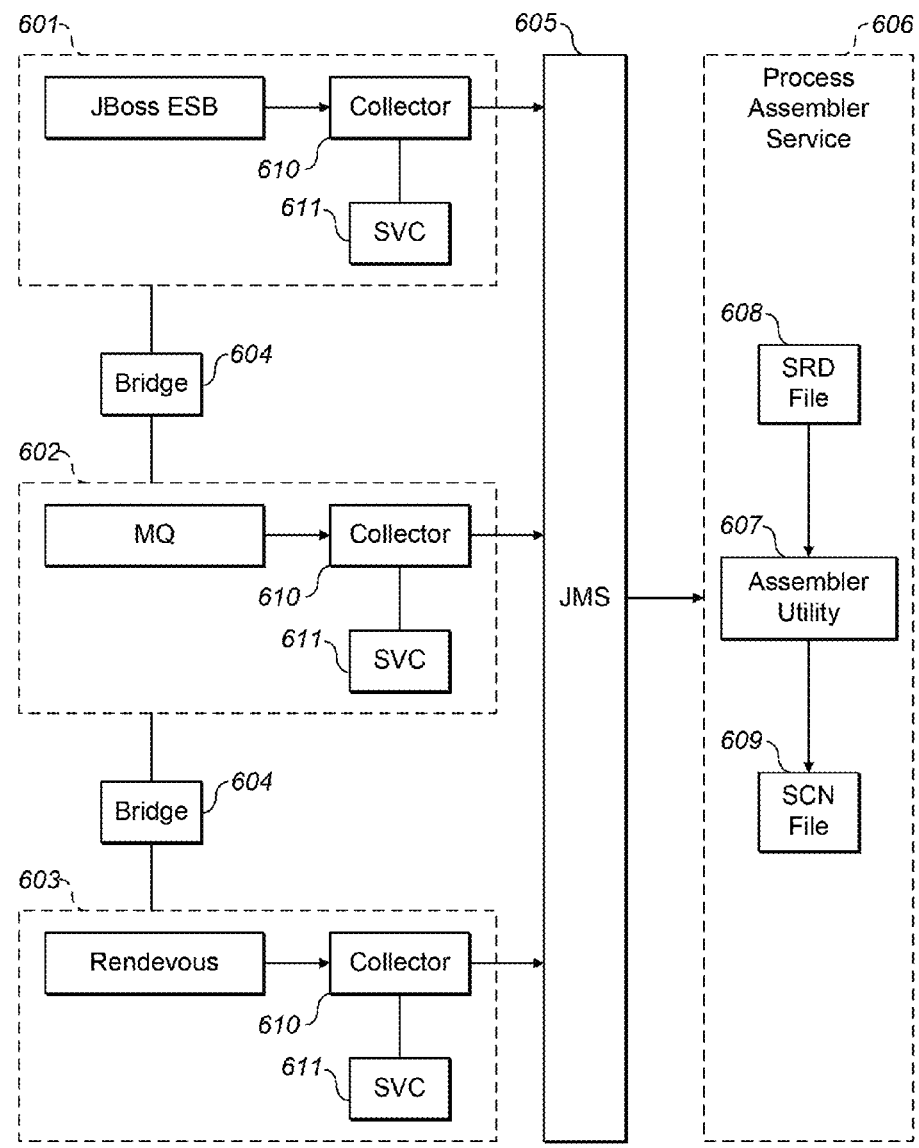
FIG. 6 shows a schematic of a multi-messaging middleware system according to the present invention.

In circumstances where a process is executing across a number of co-operating services linked via a heterogeneous mix of messaging environments a Collector configured for each messaging environment will be required. This situation is illustrated in FIG. 6. This shows three messaging environments 601, 602 and 603 connected by bridges 604. In this circumstance the Collectors report the Service Tracker messages to a single instance of the Assembler Utility 607 in a common format. This ensures the Assembler Utility is agnostic to the source of the Service Tracker message and enables the Assembler Utility to compile an end-to-end description of the overall process even though that process may complete over a heterogeneous mix of messaging environments.

The Assembler Utility uses a configuration file 608 that provides information on the Service Tracker topic and details of how to locate unique identity information in the digital message contained in the tracker record. This configuration file is called the "Service Recording Definition" (SRD) file. An example for a simple message structure is as follows:

```
<config name="QuoteExample" >
    <identity name="TxnID" >
        <token name="QuoteID" />
        <token name="PurchaseOrderID" />
    </identity>
    <queries>
        <query name="quoteId" value="//tns:quoteId/text( )"/>
        <query name="quoteReferenceId"
        value="//tns:quoteReferenceId/text( )"/>
        <query name="purchaseOrderId"
        value="//tns:purchaseId/text( )"/>
    </queries>
    <attributes>
        <tns value="http://www.helixsys.net/QuoteExample"/>
        <trimIdentity value="true"/>
    </attributes>
    <valueExtractors>
        <!-- default is the builtin SimpleXMLValueExtractor -->
        <valueExtractor name="default" content="xml" />
    </valueExtractors>
    <messages>
        <message content="xml" valueExtractor="default"
rootElementName="tns:quoteRequest">
            <tokens>
                <token name="QuoteID" query="quoteId"/>
            </tokens>
        </message>
        <message content="xml" valueExtractor="default"
rootElementName="tns:creditCheck">
            <tokens>
                <token name="QuoteID" query="quoteId"/>
            </tokens>
        </message>
        <message content="xml" valueExtractor="default"
rootElementName="tns:quote">
            <tokens>
                <token name="QuoteID" query="quoteId"/>
            </tokens>
        </message>
        <message content="xml" valueExtractor="default"
rootElementName="tns:purchaseOrder">
            <tokens>
                <token
                name="PurchaseOrderID" query="purchaseOrderId"/>
                <token name="QuoteID" query="quoteReferenceId"/>
            </tokens>
        </message>
        <message content="xml" valueExtractor="default"
rootElementName="tns:orderDispatched">
            <tokens>
                <token
                name="PurchaseOrderID" query="purchaseOrderId"/>
            </tokens>
        </message>
```

```
    </messages>
</config>
```

The SRD file describes how to extract identity information from the service message. The identity is a value which uniquely identifies the collection of messages for one complete execution path of a service. The configuration is composed of five sections:

Identity—specifies the components of the identity queries—defines the queries for extracting information from the messages attributes—defines attributes used during the value extraction valueExtractors—specifies functions that will be used to extract information from the messages messages—defines the details of the messages that will queried for information Each message element defines the type of content, the message type, the value extractor to use and contains token elements which define the fields in the message for which information will extracted to form the identity. An XML value extractor is provided which is the default. Other types of extractors can be written to cater for more complex situations and other content formats. The format of the query element is value extractor dependent. In the example shown the queries are Xpath queries.

This example is for a simple xml message:

```
<quoteRequest xmlns="http://www.helixsys.net/QuoteExample">
    <quoteId>091124095220000</quoteId>
    <amount>3000</amount>
    <surname>Godwinson</surname>
    <firstName>Harold</firstName>
    <ssn>1066-001</ssn>
    <address>
        <house>The Castle</house>
        <street>The High Street</street>
        <town>Battle</town>
        <county>East Sussex</county>
        <postcode>TN33 5AD</postcode>
    </address>
</quoteRequest>
```

In this instance, the message with the rootElementName quoteId would be used to extract information for the identity. The value extractor iterates through the tokens within the message element and uses the associated query to obtain data from the particular field of the message. For this message it uses the quoteID query and the value attribute of this query is an Xpath expression that extracts the contents of the <quoteId> tag within the message.

A more complex example for a DTCC FpML would be as follows:

```
<config xmlns:tns="http://www.hattricksoftware.com/DTCCExample" name="DTCCExample"
>
    <identity name="TradeIdentifier" >
        <token name="TradeIdentifierToken" />
    </identity>
    <queries>
        <query name="newIncreaseSubmitType"
value="//rm:Manifest/rm:TradeMsg/rm:Submitter/rm:partyTradeIdentifier/fpml:tradeId[@tradeId
Scheme="TradeRefNbr"]/text( )"/>
        <query name="newIncreasePendingType"
value="//rm:Manifest/rm:TradeMsg/rm:YourTradeId/rm:partyTradeIdentifier/fpml:tradeId[@trade
IdScheme="TradeRefNbr"]/text( )" />
        <query name="newIncreaseUnconfirmedType"
```

```
value="//rm:Manifest/rm:TradeMsg/rm:YourTradeId/rm:partyTradeIdentifier/fpml:tradeId[@trade
IdScheme="TradeRefNbr"]/text( )" />
        <query name="newIncreaseConfirmedType"
value="//rm:Manifest/rm:TradeMsg/rm:YourTradeId/rm:partyTradeIdentifier/fpml:tradeId[@trade
IdScheme="TradeRefNbr"]/text( )" />
    </queries>
    <attributes>
        <trimIdentity value="true"/>
    </attributes>
    <valueExtractors>
        <!-- default is the builtin SimpleXMLValueExtractor -->
        <valueExtractor name="default" content="xml" />
    </valueExtractors>
    <messages>
        <message content="xml" valueExtractor="default" type=" {OTC_RM_6-
1}NewIncreaseSubmitType">
            <tokens>
                <token name="TradeIdentifierToken"
query="newIncreaseSubmitType"/>
            </tokens>
        </message>
        <message content="xml" valueExtractor="default" type=" {OTC_RM_6-
1}NewIncreasePendingType">
            <tokens>
                <token name="TradeIdentifierToken"
query="newIncreasePendingType"/>
            </tokens>
        </message>
        <message content="xml" valueExtractor="default" type=" {OTC_RM_6-
1}NewIncreaseUnconfirmedType">
            <tokens>
                <token name="TradeIdentifierToken"
query="newIncreaseUnconfirmedType"/>
            </tokens>
        </message>
        <message content="xml" valueExtractor="default" type=" {OTC_RM_6-
1}NewIncreaseConfirmedType">
            <tokens>
                <token name="TradeIdentifierToken"
query="newIncreaseConfirmedType"/>
            </tokens>
        </message>
    </messages>
</config>
```

The difference between this and the simple SRD file example are the message types. The DTCC FpML messages do not have unique root elements but all have the same root element, for example:

```
<OTC_RM xmlns="OTC_RM_6-1">
    <Manifest>
        <TradeMsg>
            <!--- This is an A-Attribute -->
            <Activity>New</Activity>
            <!--- This is an B-Attribute -->
            <Status>Submit</Status>
            <!--- This is an C-Attribute -->
            <TransType>Increase</TransType>
            <ProductType>CreditDefaultSwapShort</ProductType>
            <!--- This is an D-Attribute for identity -->
            <Submitter>
                <partyTradeIdentifier>
                    <fpml:partyReference href="A" />
                    <fpml:tradeId
                    tradeIdScheme="TradeRefNbr">TW000100</fpml:tradeId>
                    <fpml:tradeId
                        tradeIdScheme=
                        "DTCCTradeId">TRADE_000100</fpml:tradeId>
                    <fpml:tradeId
tradeIdScheme="TradeRefNbrSupplement">000001</fpml:tradeId>
                </partyTradeIdentifier>
```

The element attribute is replaced with the type attribute which maps to the messageType. The FpML messages are substantially more complex than the simple example XML message and this is reflected in the query value.

"//rm:Manifest/rm:TradeMsg/rm:Submitter/rm:partyTradeIdentifier/
fpml:tradeId[@tradeIdScheme="TradeRefNbr"]/text( )"

This query navigates down <Manifest> to <TradeMsg> to <Submitter> to <partyTradeIdentifier> and extracts the value of the <tradeId> tag whose tradeIdScheme attribute equals "TradeRefNbr".

There are circumstances where the fields and values that comprise the unique identity of a digital message change as a process moves through different stages of its life cycle. These variations have to be correlated to maintain the chain of messages that comprise a specific execution path. The general cases are where:

the field(s) containing identity change but the value remains constant. An example of this could be where the initial message contains a field <socialSecurityId> and a subsequent message does not contain the <socialSecurityId> field but contains a field <referenceId> whose value is the same as the value of the <socialSecurityId> the field(s) and values change. An example of this could where an initial message contains a field <quoteID>; a subsequent message contains the <quoteID> field and a <transactionId> field with a different value to the value of the <quoteID> field and further messages that contain only the <transactionId> field To handle more complex cases an exit can be specified to provide the correlation of the unique identity of the digital messages of a specific execution path.

The Assembler Utility initializes the JMS environment 605 and waits for Service Tracker messages to be published. The configuration information the JMS environment can either be specified in a JMS configuration file, for example:

```
<config>
    <tracker>
        <jndi>
    <initialContextFactory>org.jnp.interfaces.NamingContextFactory
</initialContextFactory>
        <providerURL>jnp://localhost:1099</providerURL>
    <factoryURLPackages>org.jboss.naming:org.jnp.interfaces
    </factoryURLPackages>
      </jndi>
        <jms>
            <connectionFactory>ConnectionFactory</connectionFactory>
        <connectionFactoryAlternate>ConnectionFactory
        </connectionFactoryAlternate>
            <destination>topic/tracker</destination>
        </jms>
    </tracker>
</config>
```

Alternatively the <tracker> section can be included in the SRD file. Having the JMS configuration in a separate file allows the same SRD file to be used in different environments.

As each Service Tracker message is received the unique identity information is extracted and the digital message is stored ordered by the unique identity, timestamp and sequence number.

Over time a picture of the service interactions is built up. A service interaction is a pair of either request-sent/request-received or response-sent/response received. A simple example is shown in Table 2.

TABLE 2

| Send validate request | Receive validate request |
|---|---|
| Receive validate response | Send validate response |

A Scenario is the set of interactions with the same unique identity ordered by time. At a point in time, (which is configurable), the collection is stopped and the service interactions are analysed. For each unique set of interactions, a Scenario model is created and written to a file 609. This file can is then opened with a suitable editing tool.

Figure 2:
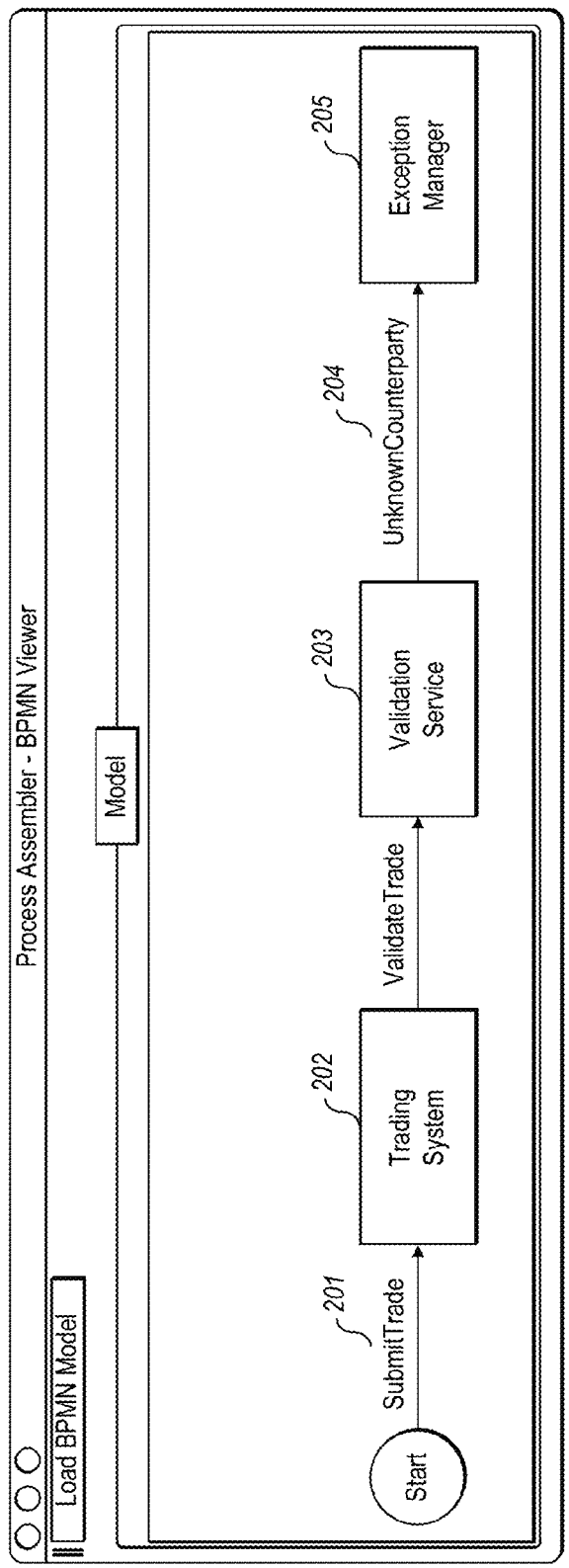
FIG. 2 shows a screen shot from the Assembler Utility BPMN Viewer displaying one Scenario of a trading system, which was captured using the Assembler Utility.

The BPMN2 diagram in FIG. 2 shows one execution path of a sample trading system process that was captured using the Assembly Utility. The initial event 201 is a submitTrade message received by the trading system 202. The trading system sends a validateTrade message to a validation service 203. The validation service detects an error with the message and sends an unknownCounterparty message 204 to the exception manager 205.

Figure 3:
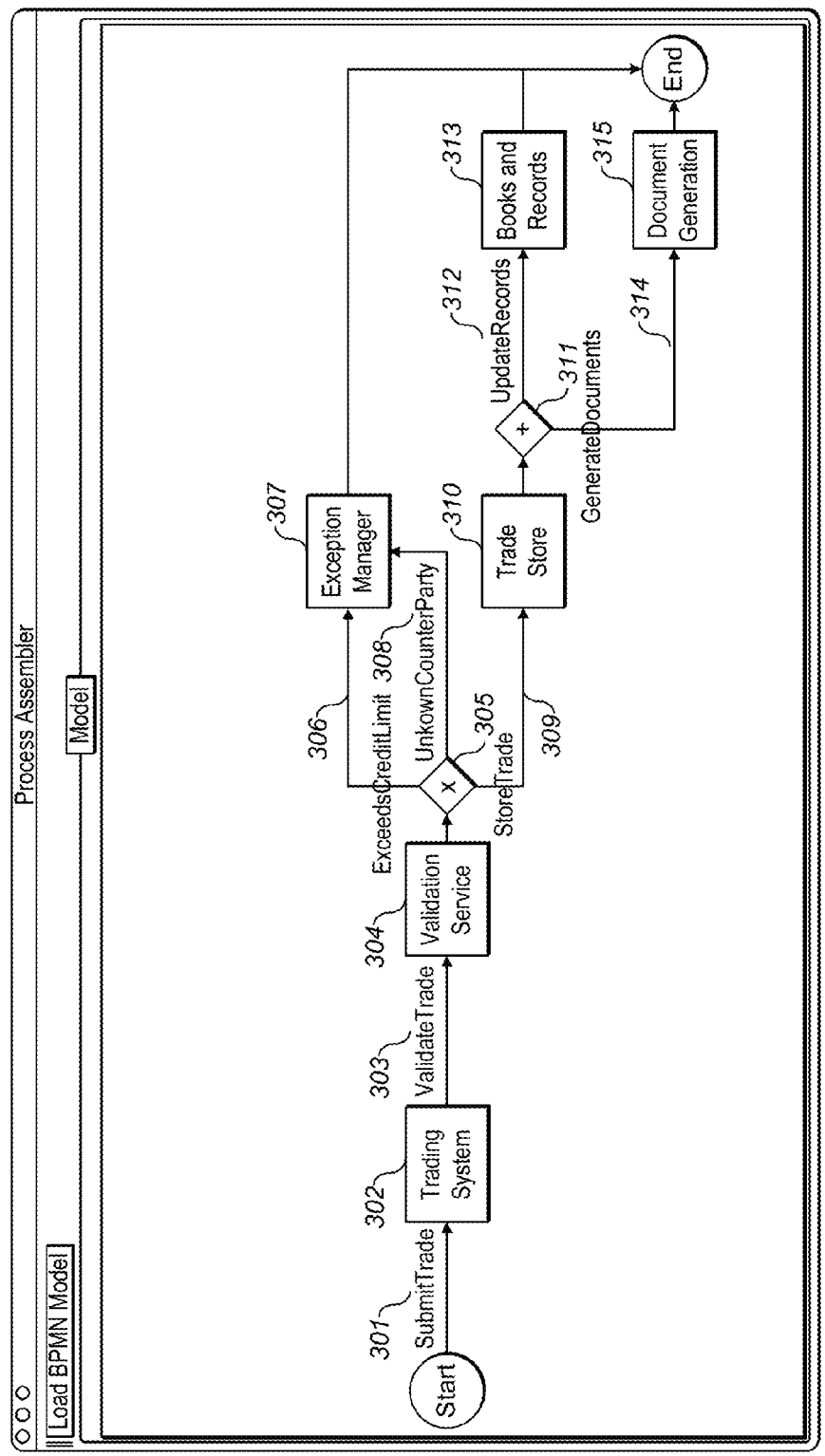
FIG. 3 shows a screen shot from the Assembler Utility BPMN Viewer illustrating the combining of the Scenario shown in FIG. 2 with three other Scenarios into a Process Design.
Figure 5:
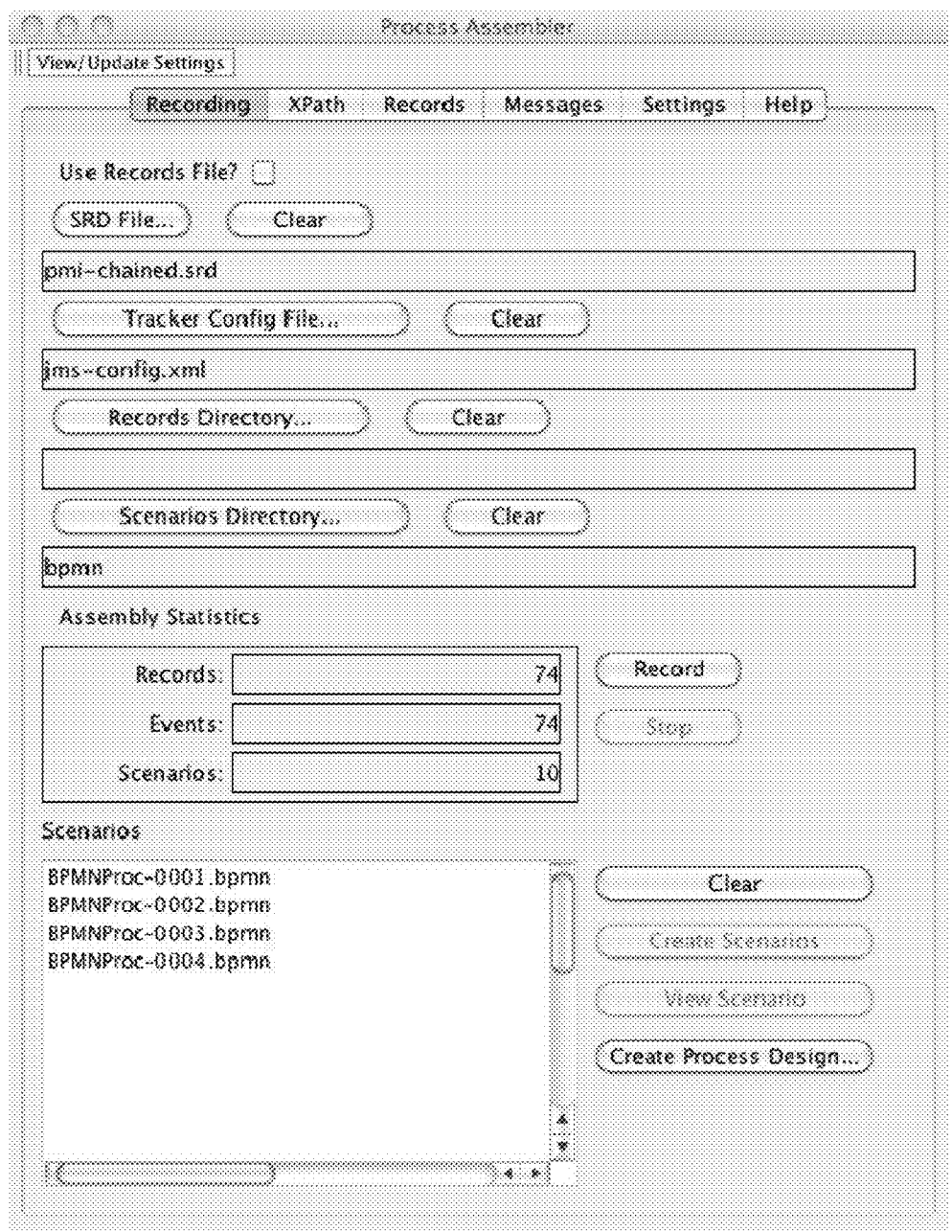
FIG. 5 shows the user interface of the Process Assembler that processes the information from the Collectors; the captured Scenarios to be created, reviewed and for the Process Design to be created.

The Scenarios are aggregated into a process description, called the Process Design. The BPMN2 diagram shown in the screen shot of FIG. 3 illustrates the merging of the Scenario shown in FIG. 2 with two other Scenarios of the trading system process captured using the Assembly Utility. The Scenario shown in FIG. 2 is represented by the path 301, 302, 303, 304, 305, 308 and 307 in FIG. 3. The merging process has produced two additional outward flows from the validation service 304. This is shown by the exclusive gateway 305 and the flows 306 and 309. The flow 306 is another error path. The flow 309 is the valid trade flow being sent to the trade store 310 that has two simultaneous outward flows which is shown by the parallel gateway 311. These are the updateRecords message 312 to books and records 313 add the generateDocuments message 314 to the document generation service 315. FIG. 5 shows a screenshot of the user interface of the Process Assembler, which is used to capture this information.

Other Environments

The technical aspects of the present invention have thus far been described by reference to the ClearGate™ environment. However, it will be appreciated that the techniques and methods described here are equally applicable to other environments where co-operating services exchange messages across a messaging environment(s). Examples of such environments are: J2EE Enterprise Service Bus (ESB); J2EE Java Messaging System (JMS); IBM Websphere MQSeries and Message Broker; Tibco Messaging and other message oriented middleware environments. All that is required is the message bus is furnished with a specific Collector to observe and report the digital messages that relate to a process. This Collector the message bus and publishes Service Tracker messages. The collection, analysis, Scenario creation and Process Design generation functions are messaging environment independent.

FIG. 4 illustrates the interaction of the components for the capture of the digital messages and process assembly in the present invention. In particular, the interactions between the Collector 402, Assembler Utility 405 and the (JMS) messaging environment 404 are shown. The Collector 402 reads configuration information from a configuration file, in this instance a Service Validator Configuration (SVC) file 403. The Assembler Utility 405 reads configuration information from the Scenario Recording Definition (SRD) file 406 and writes the identified Scenarios to one or more Scenario model files (SCN) 407. Here the term SCN file refers generically to the output of the Process Assembler Scenario generation, and the precise suffix used for a given file is dependent on the model notation configured in the Process Assembler. For example, the suffix ".bmpn" is used in association with such files where BMPN2 is the model notation, as shown in FIG. 5.

FIG. 6 illustrates the interactions between components of the present invention in a multi-messaging middleware environment. The dotted boxes 601, 602 and 603 on the left are messaging environments. The Collectors 610 are environment specific. The Service Validator Configuration (SVC) files 611 are also environment specific. The Bridges 604 shown between each message environment is a commonly used function. It takes a message from one messaging environment and delivers it into another messaging environment in the required format. As with a single messaging environment (shown in FIG. 4), the Assembler Utility 607 assembles the Process Design from the information extracted from the observed digital messages being transmitted across the multiple messaging environments. Again, as with the single messaging environment, JMS 605 is the preferred mechanism for publishing the service tracking information.

Figure 7:
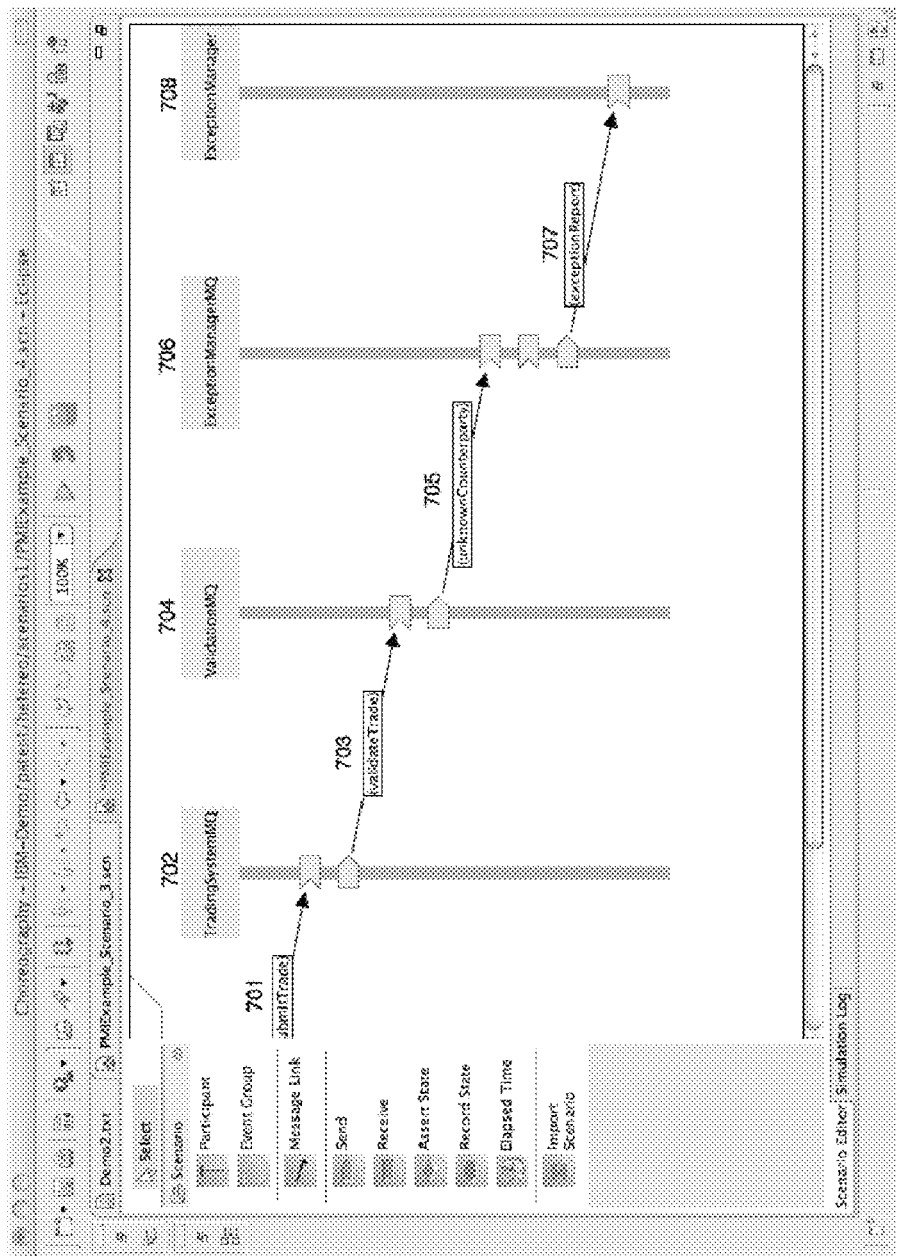
FIG. 7 shows a screen shot from a WS-CDL tool of a Scenario captured from a heterogeneous messaging environment; and, FIG. 8 shows a screen shot a WS-CDL tool of an erroneous Scenario captured from a heterogeneous messaging environment.

FIG. 7 shows a Scenario captured from such a heterogeneous messaging environment. The environments employed are JBOSS ESB and IBM MQSeries. The MQ services are TradingSystemMQ 702, ValidationMQ 704 and ExceptionManagerMQ 706. The JBOSS service is ExceptionManager 708. A submitTrade message 701 is received by the TradingSystemMQ Service 702 which sends a validateTrade 703 message to the ValidationMQ Service 704. This service in turn sends an unknownCounterparty message 705 to the ExceptionManagerMQ service 706. The ExceptionManagerMQ service 706 reports the exception by sending exceptionReport message 707 to ExceptionManager service 708 running in the JBOSS ESB environment.

Figure 8:
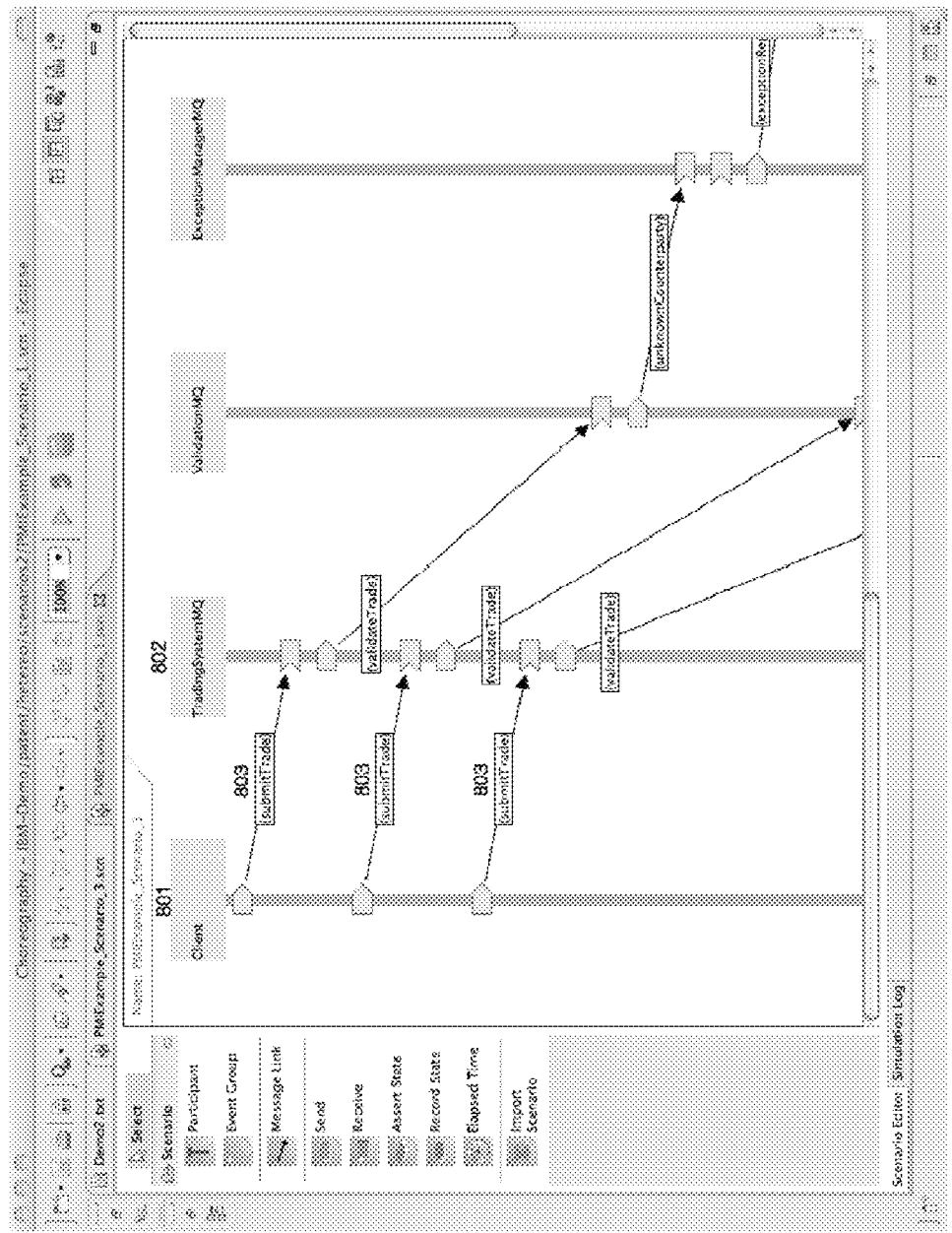

FIG. 8 shows another captured Scenario. In this instance, Client 801 has generated multiple trades 803 with identical transaction identifiers. This should be compared to the Scenario shown in FIG. 7, as it shows the correct functioning of the system. The automated capture of the replicated execution paths displayed in FIG. 8 enabled the erroneous functioning of the system to be identified, isolated and corrected within minutes as against hours using conventional techniques.

Other Message Formats

The XML message format has been the preferred format for the technical description since it is used extensively through the IT industry. However the present invention is not limited to XML messages and is able to support multiple other formats such as text, object and binary messages. In the ClearGate™ system the extraction of the messageType and the identity information from a message is encapsulated in the MessageTypeResolver, and MessageIdentityResolver. This technique can also be applied to other message formats.

As will be appreciated by those skilled in the art the present invention provides a powerful mechanism for the automated capture of complex processes executing across a heterogeneous mix of messaging environments together with the ability to document these processes in a variety of design notations. Such notations can include BPEL and BPMN thus facilitating the exchange of information with other tool suites and related capabilities.

The invention claimed is:

1. A method of assembling a machine readable description of an existing automated process from the exchange of digital messages between two or more services communicating across a heterogeneous messaging environment, the method comprising employing a computer, having a processor, data store, one or more computer-readable media, and memory, to execute instructions stored in the memory in order to cause the processor to perform the steps of:

(a) observing a plurality of digital messages in a plurality of messaging environments;

(b) filtering each digital message by comparing the service name of the digital message against a predetermined list of service names to be monitored;

(c) identifying services consuming the messages where such services are not identified via the predetermined list of service names to be monitored;

(d) publishing a tracker record for each message in a common format independent of the associated messaging environment, the tracker record comprising the message, a message direction indicating whether the message has been sent from or retrieved by a service, and a service name for the service that has sent or retrieved the message, (e) storing details of each digital message in a store by performing the steps of:

(i) extracting a message type of the digital message using a predetermined query;

(ii) extracting a unique identity of the digital message using a predetermined query, the unique identity comprising unique identifying information from a plurality of fields of the message; and, (iii) storing the digital message ordered by unique identity, timestamp for when the digital message was received or sent, service name, and message type, (f) processing the store of digital messages into a set of service execution path descriptions by performing the steps of:

(iv) assembling by unique identity a time sequence of message type, message direction, and service name; and, (v) creating a service execution path description for each unique sequence of timestamp, message type, message direction and service name, and (g) processing the set of service execution path descriptions into the machine readable description for the existing automated process, wherein the existing automated process consists only of machine-to-machine interactions and the method is performed without alteration to any one of the digital messages, a messaging sequencing, the services, and an encoding of the production environment, and wherein the machine readable description describes all possible execution paths available to all digital messages exchanged across the heterogeneous messaging environment.

2. The method according to claim 1, wherein variations in the unique identifying information extracted from at least one of the plurality of fields of a series of digital messages are correlated to maintain a chain of identities for each service execution path.

3. The method according to claim 1, further comprising the steps of:

submitting randomized test messages for observation;

capturing service interactions generated by the test messages and performing a regression analysis; and, compiling the captured service interactions into separate service execution path descriptions as each unique execution path is identified, whereby to identify all possible execution paths available to the existing automated process.

4. The method according to claim 1, wherein the service execution path descriptions are processed into an executable process design language.

5. The method according to claim 4, wherein the executable process design language is Business Process Modeling Notation Version 2 (BPMN2).

6. The method according to claim 4, wherein the executable process design language is Web Services Choreography Description Language (WS-CDL).

7. The method according to claim 1, wherein the set of service execution path descriptions are processed into the machine readable description for the process using a messaging environment independent utility.

8. The method according to claim 7, wherein the machine readable description is the executable process design language Business Process Modeling Notation Version 2 (BPMN2).

9. The method according to claim 7, wherein the machine readable description is the executable process design language Web Services Choreography Description Language (WS-CDL).

10. The method according to claim 1, wherein the messages are observed at the entry and exit points of the digital message onto a message bus.

11. The method according to claim 1, wherein each tracker messages is published as a Java Message Service (JMS) Topic.

12. A computer program product stored on a computer readable medium comprising one or more computer-readable media having thereon computer-executable instructions that, when executed by one or more processors of a computer, causes the one or more processors of the computer to perform a method for assembling a machine readable description of an existing automated process from the exchange of digital messages between two or more services communicating across a heterogeneous messaging environment, the method comprising the steps of:

(a) observing a plurality of digital messages in a plurality of messaging environments;

(b) filtering each digital message by comparing the service name of the digital message against a predetermined list of service names to be monitored;

(c) identifying services consuming the messages where such services are not identified via the predetermined list of service names to be monitored;

(d) publishing a tracker record for each message in a common format independent of the associated messaging environment, the tracker record comprising the message, a message direction indicating whether the message has been sent from or retrieved by a service, and a service name for the service that has sent or retrieved the message, (e) storing details of each digital message in a store by performing the steps of:
  (i) extracting a message type of the digital message using a predetermined query;
  (ii) extracting a unique identity of the digital message using a predetermined query, the unique identity comprising unique identifying information from a plurality of fields of the message; and,
  (iii) storing the digital message ordered by unique identity, timestamp for when the digital message was received or sent, service name, and message type, (f) processing the store of digital messages into a set of service execution path descriptions by performing the steps of:
  (iv) assembling by unique identity a time sequence of message type, message direction, and service name; and,
  (v) creating a service execution path description for each unique sequence of timestamp, message type, message direction and service name, and (g) processing the set of service execution path descriptions into the machine readable description for the existing automated process, wherein the existing automated process consists only of machine-to-machine interactions and the method is performed without alteration to any one of the digital messages, a messaging sequencing, the services, and an encoding of the production environment, and wherein the machine readable description describes all possible execution paths available to all digital messages exchanged across the heterogeneous messaging environment.

13. A system configured to assemble a machine readable description of an existing automated process from the exchange of digital messages between two or more services communicating across a heterogeneous messaging environment, the system comprising:

at least one message bus along which the digital messages are carried;

a data store for storing the messages and associated information; and, a processor configured to:

(a) observe a plurality of digital messages in a plurality of messaging environments on the at least one message bus;

(b) filter each digital message by comparing the service name of the digital message against a predetermined list of service names to be monitored;

(c) identify services consuming the messages where such services are not identified via the predetermined list of service names to be monitored;

(d) publish a tracker record for each message in a common format independent of the associated messaging environment, the tracker record comprising the message, a message direction indicating whether the message has been sent from or retrieved by a service, and a service name for the service that has sent or retrieved the message;

(e) store details of each digital message in the data store by performing the steps of:
  (i) extracting a message type of the digital message using a predetermined query;
  (ii) extracting a unique identity of the digital message using a predetermined query, the unique identity comprising unique identifying information from a plurality of fields of the message; and,
  (iii) storing the digital message ordered by unique identity, timestamp for when the digital message was received or sent, service name, and message type, (f) process the store of digital messages into a set of service execution path descriptions by performing the steps of:
  (iv) assembling by unique identity a time sequence of message type, message direction, and service name; and,
  (v) creating a service execution path description for each unique sequence of timestamp, message type, message direction and service name, and (g) process the set of service execution path descriptions into the machine readable description for the existing automated process, wherein the existing automated process consists only of machine-to-machine interactions and the method is performed without alteration to any one of the digital messages, a messaging sequencing, the services, and an encoding of the production environment, and wherein the machine readable description describes all possible execution paths available to all digital messages exchanged across the heterogeneous messaging environment.

14. The system according to claim 13, wherein the system comprises a separate collector utility deployed for each internal messaging environment being observed, each collector utility being configured to observe and filter the digital messages in the respective internal messaging environment.

15. The system according to claim 13, wherein the tracker record for each message is published on a different message bus.

16. The system according to claim 15, wherein each tracker messages is published as a Java Message Service (JMS) Topic.

17. The system according to claim 13, wherein the messages are observed at the entry and exit points of the digital message onto a message bus.

18. The system according to claim 13, wherein the service execution path descriptions are created using an executable process design language.

19. The system according to claim 18, wherein the executable process design language is Business Process Modeling Notation Version 2 (BPMN2).

20. The system according to claim 18, wherein the executable process design language is Web Services Choreography Description Language (WS-CDL).

21. The system according to claim 13, wherein the set of service execution path descriptions are processed into the machine readable description for the existing automated process using a messaging environment independent utility.

22. The system according to claim 21, wherein the machine readable description is the executable process design language Business Process Modeling Notation Version 2 (BPMN2).

23. The system according to claim 21, wherein the machine readable description is the executable process design language Web Services Choreography Description Language (WS-CDL).

* * * * *